United States Patent
Nicolson et al.

(10) Patent No.: US 9,537,584 B2
(45) Date of Patent: *Jan. 3, 2017

(54) PHASED ARRAY DEVICE AND CALIBRATION METHOD THEREFOR

(71) Applicant: MediaTek Singapore Pte. Ltd., Singapore (SG)

(72) Inventors: Sean Timothy Nicolson, Mountain View, CA (US); ChuanKang Liang, San Jose, CA (US); Jing-Hong Conan Zhan, Hsinchu (TW)

(73) Assignee: MEDIATEK SINGAPORE PTE. PTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 14/734,424

(22) Filed: Jun. 9, 2015

(65) Prior Publication Data

US 2015/0270911 A1    Sep. 24, 2015

Related U.S. Application Data

(63) Continuation of application No. 13/612,811, filed on Sep. 12, 2012, now Pat. No. 9,088,448.

(Continued)

(51) Int. Cl.
*H04B 17/00*    (2015.01)
*H04B 17/14*    (2015.01)
(Continued)

(52) U.S. Cl.
CPC .............. *H04B 17/14* (2015.01); *H01Q 3/267* (2013.01); *H04B 7/04* (2013.01); *H04L 25/03878* (2013.01)

(58) Field of Classification Search
USPC ........ 375/221, 229, 220, 222, 308, 300, 340
See application file for complete search history.

(56) References Cited

U.S. PATENT DOCUMENTS 8,068,844 B2    11/2011  Li et al.
8,290,089 B2 *  10/2012  Howard et al. ............... 375/316
(Continued)

FOREIGN PATENT DOCUMENTS

CN    1150499    5/1997
CN    1830159    9/2006
(Continued)

OTHER PUBLICATIONS

Charles, C.T., et al.; "A Calibrated Phase and Amplitude Control System for a 1.9 GHz Phased-Array Transmitter Element;" IEEE Transactions on Circuits and Systems-I: Regular Papers; vol. 56; No. 12; Dec. 2009; pp. 2728-2737.

(Continued)

*Primary Examiner* — Kabir A Timory
(74) *Attorney, Agent, or Firm* — McClure, Qualey & Rodack, LLP (57) ABSTRACT

The calibration method, performed on a phased array device, wherein the method initiates a test signal and looping back a plurality of channel responses corresponding to the channel elements through the transmission line to a calibration circuit in the phased array device, wherein each of the channel responses is obtained when one of the channel elements is turned on, and the rest of the channel elements are turned off. The method further calculates a characteristic value corresponding to the transmission line based on the obtained channel responses of the channel elements, and adjusts a channel parameter of one of the channel elements based on the characteristic value of the transmission line.

17 Claims, 6 Drawing Sheets

Related U.S. Application Data

(60) Provisional application No. 61/558,661, filed on Nov. 11, 2011.

(51) Int. Cl.
  *H04L 25/03* (2006.01)
  *H01Q 3/26* (2006.01)
  *H04B 7/04* (2006.01)

(56) References Cited

U.S. PATENT DOCUMENTS

| | | | |
|---|---|---|---|
| 2006/0203710 A1* | 9/2006 | Mukkavilli et al. | 370/208 |
| 2007/0086536 A1* | 4/2007 | Ketchum | H04B 7/0413 |
| | | | 375/260 |
| 2010/0164802 A1 | 7/2010 | Li et al. | |

FOREIGN PATENT DOCUMENTS

| | | |
|---|---|---|
| CN | 101808341 | 8/2010 |
| EP | 1126544 | 8/2001 |

OTHER PUBLICATIONS

Banbury, D.R., et al.; "A CMOS 5.52.4 GHz dual-band smart-antenna transceiver with a novel RF dual-band phase shifter for WLAN 802.11abg;" IEEE Radio Frequency Integrated Circuits Symposium; 2004; pp. 157-160.

* cited by examiner

PHASED ARRAY DEVICE AND CALIBRATION METHOD THEREFOR

CROSS REFERENCE TO RELATED APPLICATIONS

This Application is a Continuation of U.S. application Ser. No. 13/612,811, filed on Sep. 12, 2012, now U.S. Pat. No. 9,088,448, which claims priority of U.S. Provisional Application No. 61/558,661, filed on 11 Nov. 2011, and the entireties of which are incorporated by reference herein.

BACKGROUND OF THE INVENTION

Field of the Invention

The present invention relates to electronic circuits, and in particular relates to a phased-array device and a calibration method therefor.

Description of the Related Art

A phased array is an array of antennas in which the relative phases of the respective signals feeding the antennas are varied in phases and gains relationship that the effective radiation pattern of the array is reinforced in a desired direction and suppressed in undesired directions. Corresponding to the each antenna there is a transmitter and receiver responsible for managing the phases and gains relationship of the respective signal feeding in the antenna. The phased array can utilize digital techniques for antenna beamforming, which modify phases and amplitudes of digital signals by digitally multiplying a complex weight to each antenna feed. The signals from all elements are then combined digitally in such a way that signals at particular angles experience constructive interference while others experience destructive interference, giving a number in digital form whose directional response is a function of the array geometry and the manipulated digital signals, resulting in a controllable beamforming shape. Each antenna element feeds a dedicated receiver channel element, providing amplification and selectivity. The frequency and phase responses of the receiver channel elements must track closely, over the full dynamic range of signals to be handled.

To obtain the full benefit of a digital beamforming array it is necessary to calibrate out all phase and gain mismatches of the system. The calibration routine contains injecting a test signal into each receiving channel element in turn, and measuring the amplitude and phase of the received signal. Any departures from the desired amplitude and phase can then be compensated using corrected digital weights. The performance in the presence of channel element mismatches is critical parameter of any phased array. These variations result in amplitude and phase mismatches in the radiated/received signals and hence adversely affect the beam pattern. The mismatch may arise from the intra-chip variation inherent to any process technology.

BRIEF SUMMARY OF THE INVENTION

In one aspect of the invention, a calibration method is disclosed, performed on a phased array device comprising a plurality of channel elements coupled in parallel by a transmission line, the method comprising: obtaining a plurality of channel responses corresponding to the channel elements through the transmission line, wherein each of the channel responses is obtained when one of the channel elements is turned on, and the rest of the channel elements are turned off; calculating a characteristic value corresponding to the transmission line based on the obtained channel responses of the channel elements; and adjusting a channel parameter of one of the channel elements based on the characteristic value of the transmission line.

In another aspect of the invention, a phased array device is provided, comprising a transmission line, a plurality of channel elements, and a calibration circuit. The plurality of channel elements are coupled in parallel by the transmission line. The calibration circuit is configured to obtain a plurality of channel responses corresponding to the channel elements through the transmission line, calculate a characteristic value corresponding to the transmission line based on the obtained channel responses of the channel elements, and adjust a channel parameter of one of the channel elements based on the characteristic value of the transmission line. Each of the channel responses is obtained when one of the channel elements is turned on, and the rest of the channel elements are turned off.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

A detailed description is given in the following embodiments with reference to the accompanying drawings.

Figure 1:
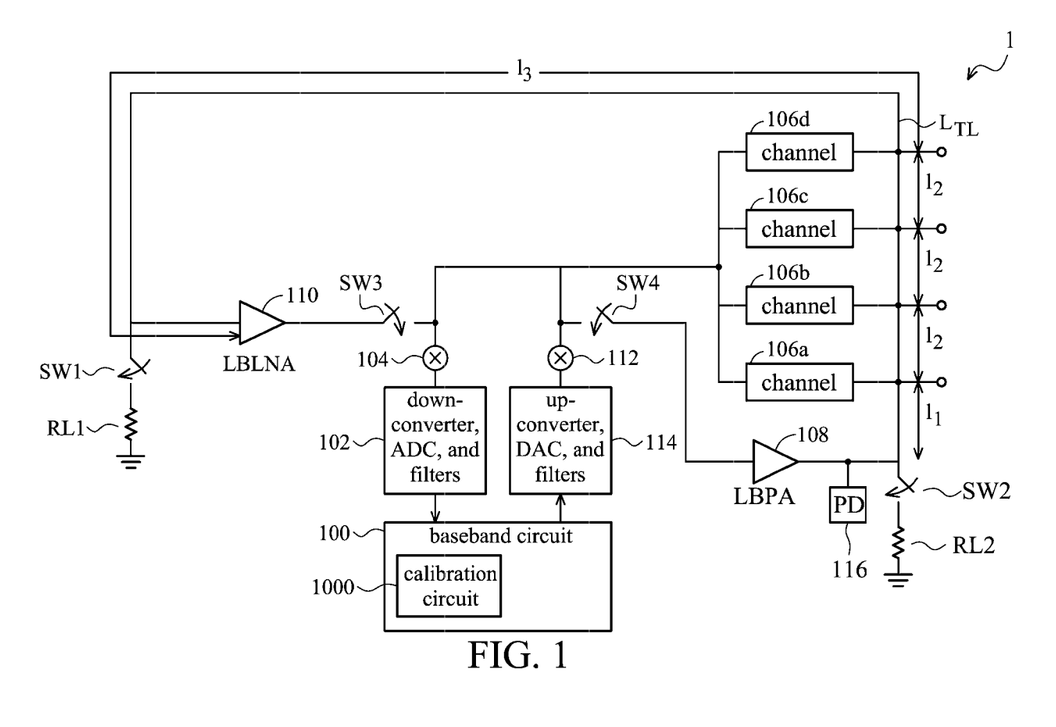
FIG. 1 is a block diagram of a phased-array device according to an embodiment of the invention.

FIG. 1 is a block diagram of a phased-array device 1 (phased array device) according to an embodiment of the invention, comprising a baseband circuit 100, down-converter and filter 102, modulator 104, channel elements 106a-d, Loopback Power Amplifier (LBPA) 108, Loopback Low Noise Amplifier (LBLNA) 110, demodulator 112, up-converter and filter 114, power meter (PM) 116, switches SW1-SW4, resistors RL1 and RL2, and transmission line $L_{TL}$.

The channel elements 106a-d can comprise transmitter front ends and/or receiver front ends. Each channel element may suffer from a channel-to-channel mismatch due to differences in circuit elements and connection routes in the transmitter front ends and/or receiver front ends. The channel elements 106 a-d are connected in an equal distance $l_2$ to one another by the transmission line $L_{TL}$. The transmission line $L_{TL}$ connects all the channel elements 106a-d, the loopback PA 108 and the loopback LNA 110 in parallel, forming signal loops between the channel elements 106a-d and the loopback LNA 110 for detecting channel-to-channel mismatch for the transmission paths, and between the loopback PA 108 and the channel elements 106a-d for detecting channel-to-channel mismatch for the receive paths. Further, channel elements 106a-d are separated by a substantially equal distance $l_2$ to one another on the transmission line $L_{TL}$. Only one of the channel-to-channel mismatches for the transmission paths and the receive paths may be determined at a time since the channel-to-channel mismatch detection procedures share the same transmission line $L_{TL}$. Therefore, only one of the loopback LNA 110 and the loopback PA 108 is required to be activated at a time, for determining the channel-to-channel mismatch for the transmission paths or receive paths respectively.

Accordingly, when detecting the mismatches in transmission paths, the loopback LNA 110 is turned on while the loopback PA 108 remains off. The mismatch detection procedure is conducted for each of the four channel elements 106a-d in turn to collect a plurality of channel responses Rk corresponding to the channel elements 106a-d through the transmission line. For example, when taking a mismatch measurement for the transmitter front end in the channel element 106a, the channel element 106a is turned on while the channel elements 106b-d remain off. The baseband circuit 100 can inject a test signal St through the channel element 106a onto the transmission line $L_{TL}$, on which the loopback LNA 110 can detect the injected test signal St' to obtain a channel response R0 for determining the channel-to-channel mismatch for the transmitter front end of the channel element 106a. The baseband circuit 100 can in turn send the test signal St by the remaining channel elements 106b-d to gather the channel responses Rk for the rest of the channel elements, with k being 1-3 corresponding to the remaining channel elements 106b-d. Specifically in the embodiment provided in FIG. 1, the loopback LNA 110 can collect 4 channel responses R0-R3 corresponding to the 4 phased array channel elements 106a-d. Based on the 4 channel responses Rk, the baseband circuit 100 can estimate a characteristic value for the transmission line $L_{TL}$, from which the baseband circuit 100 can further determine a mismatch parameter for adjusting a channel parameter of the channel elements 106a-d. The characteristic value may be associated with a transmission line attenuation constant α or a transmission line phase constant β of the transmission line $L_{TL}$. The mismatch parameter may be associated with a gain mismatch or a phase mismatch between the channel elements. The channel parameter is a control signal for varying amplitude or controlling a phase shift of the output signal of transmitter front end of the channel element 106. The test signal St may be orthogonal signals at baseband.

Similarly, when testing for the mismatches in receive paths, the loopback PA 108 is turned on and the loopback LNA 110 is turned off. The mismatch detection procedure is likewise conducted for each of the four channel elements 106a-d in turn to collect a plurality of channel responses Rk corresponding to the channel elements 106a-d through the transmission line $L_{TL}$. For example, when taking a mismatch measurement for the receiver front end in the channel element 106a, the channel element 106a is turned on while the channel elements 106b-d remain off. The baseband circuit 100 can inject a test signal St through the loopback PA 108 onto the transmission line $L_{TL}$, on which the receiver front end in the channel element 106 can detect the injected test signal St' to obtain the channel response Rk for determining the channel-to-channel mismatch for the receiver front end of the channel element 106a. The baseband circuit 100 can continue sending the test signal St by loopback PA 108 to collect the channel responses Rk for all channel elements by the channel elements 106b-d in turn. Specifically, the channel elements 106a-d can detect 4 channel responses R0-R3. Based on the 4 channel responses R0-R3, the baseband circuit 100 can estimate a characteristic value for the transmission line $L_{TL}$, from which the baseband circuit 100 can further determine a mismatch parameter for adjusting a channel parameter of the channel elements 106a-d. The characteristic value may be associated with the transmission line constant α or β of the transmission line $L_{TL}$. The mismatch parameter may be associated with a gain mismatch or a phase mismatch between the channel elements. The channel parameter may be a control signal for varying amplitude or controlling a phase shift of the output signal of receiver front end of the channel element 106. The channel parameters determined for the receiver front ends may not be the same as those determined for the transmitter front ends. The baseband circuit 100 may need to generate separate channel parameters or control signals for the transmitter and receiver front ends.

The baseband circuit 100 is configured to control all digital signal processing, including generating an outgoing baseband signal for the mismatch measurement or normal transmission procedure, and processing an incoming baseband signal for the mismatch measurement or normal reception procedure. The baseband circuit 100 comprises a calibration circuit 1000, receiving the channel responses Rk from either the loopback LNA 110 or the receiver front ends of the channel elements 10a-d, determining the characteristic values and mismatch parameters based on the received channel responses Rk, and generating the channel parameters for adjusting the amplitude and phase of the corresponding transmitter or receiver front end so that the gain and phase mismatches between channels can be calibrated or corrected. In the gain mismatch calibration, the gains for all element channels 106a-d are adjusted by digital gain control signals to render substantially the same amplitudes of output signals for the element channels 106a-d. In the phase mismatch calibration, the phase shifts for all element channels 106a-d are adjusted by digital phase control signals to render substantially no phase difference among the output signals of the element channels 106a-d.

The determination procedure of the characteristic values, mismatch parameters and the channel parameters for channel elements 106a-d are detailed in gain calibration methods 3 and 5 and phase calibration methods 4 and 6. The outgoing baseband signal can undergo a series of signal processing including digital to analog conversion, up-conversion and other filtering processes in the DAC, up-converter and filters 114 and modulation in the modulator 112 to render the loopback PA 108 or the transmitter front ends of the channel elements 106a-d the RF input signals. Conversely, the RF input signals coming out of the loopback LNA 110 and the receiver front ends of the channel elements 106-d can go through demodulation in the demodulator 104 and filtering, down-conversion, and analog-to-digital conversion in the ADC, down-converter and filters 102 to render the channel response Rk for the calibration circuit 1000 for the mismatch detection and calibration procedure.

The loopback PA 108 and the loopback LNA 110 are identical to the circuits of the transmitter front ends and the receiver front ends respectively. The power meter 116 is attached to an output of the loopback PA 108, at which a power level of the injected test signal St' is detected by the power meter 116. The power level of the injected test signal St' is closely monitored so that the gain of the loopback PA 108 can be adjusted to meet a proper received power range. The switches SW1 and SW3 can be closed to turn on the loopback LNA 110, and likewise, the switches SW2 and SW4 can be closed to turn on the loopback PA 108.

Conversely, the switches SW1 and SW3 can be opened to turn off the loopback LNA 110, and the switches SW2 and SW4 can be opened to turn off the loopback PA 108. The on and off states of the switches SW1-SW4 can be controlled by digital control signals generated from the baseband circuit 100. The resistor RL1 serves to provide an input matching for the loopback LNA 110 when being connected to the loopback LNA 110 by the switch SW1. The resistor RL2 serves to provide an output matching for the loopback PA 108 when being connected to the loopback PA 108 by the switch SW2.

The transmitter front end may contain a pre-driver, a transmitter phase shifter, a power amplifier, and switches. The transmitter phase shifter may adjust a transmitter phase of a transmitter output signal to account for a phase difference mismatch between the transmitter front ends in channel elements 106a-d. The transmitter phase shifter may also adjust the transmitter phase of the transmitter output signal to produce a transmitter output signal with a desired phase shift. In some embodiments, the same transmitter phase shifter is used for the phase mismatch correction and the phase shift generation. In other embodiments, separate transmitter phase shifters are used for the phase mismatch correction and the phase shift generation. The transmitter phase shifter can adjust the transmitter phase of the transmitter output signal according to a digital phase control signal (not shown). The power amplifier can increase power of the transmitter input signals with a transmitter gain, adjustable by a digital gain control signal (not shown) to produce the output signal with wanted amplitude. The receiver front end may comprise a receiver phase shifter, a low noise amplifier and switches. Similar to the transmitter phase shifter, the receiver phase shifter may adjust a phase of a receiver output signal for the receiver front end to remove or reduce a phase difference mismatch between the receiver front ends in channel elements 106a-d, or, may adjust the phase of the receiver output signal for the receiver front end to produce a receiver output signal with a desired phase shift. The phase mismatch correction and the phase shift generation of the receiver output signal may be implemented by a shared or separate receiver phase shifters. The receiver phase shifter can adjust the receiver phase of the receiver output signal according to a digital phase control signal (not shown). The low noise amplifier amplifies power of the receiver output signals with a receiver front end gain, adjustable by a digital gain control signal (not shown) to render wanted amplitude for the receiver output signal. In some embodiments, the transmitter phase shifter and the receiver phase shifter are implemented by a single phase shifter, shared by both the transmitter front end and receiver front end in each channel element. A pair of the transmitter and receiver front ends may share the same antenna and the same signal path to the modulator 112/demodulator 104, and the switch is used to select between the transmit path and the receive path.

Figure 2:
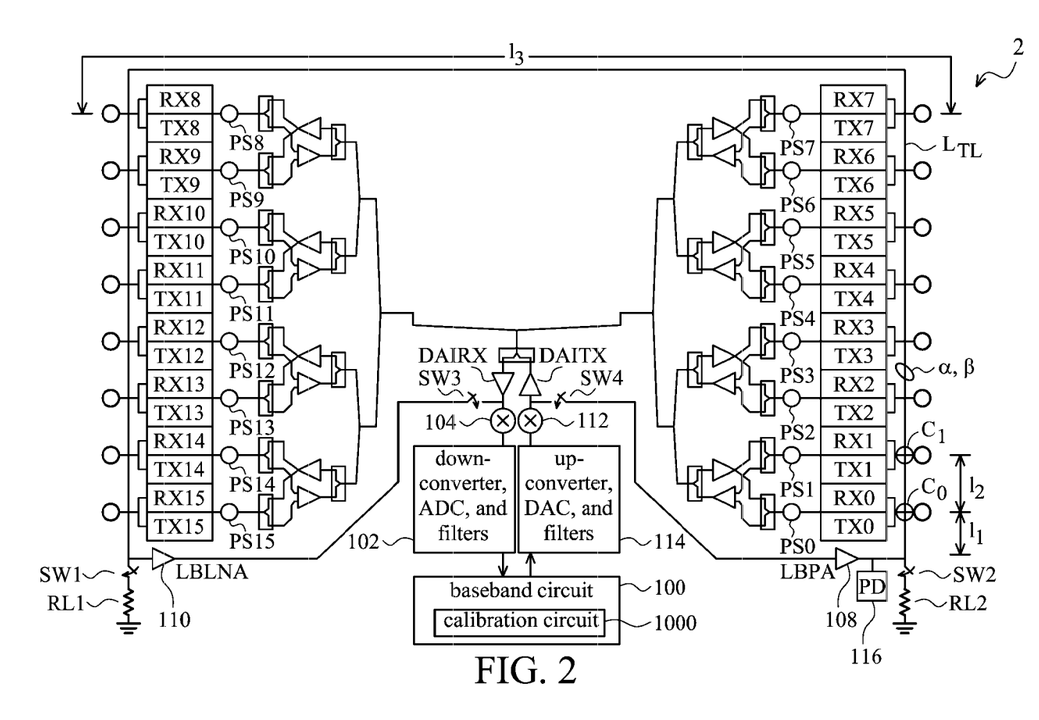
FIG. 2 is a block diagram of a phased-array device according to another embodiment of the invention.

FIG. 2 is a block diagram of a phased-array device 2 according to another embodiment of the invention. The phased-array device 2 is a 16-channel elements phased array, similar to the phased-array device 1, except that each channel element in the phased-array device 2 comprises a transmitter front end TX and a receiver front end RX.

When the phased-array device 2 is in a factory test or being powered-on, the channel-to-channel calibration methods 3-6 can be launched to reduce or remove the gain and phase mismatches among transmitter front ends TX0-TX15, and among receiver front ends RX0-RX15. The interval between the channel-to-channel calibrations will depend on the timescale on which the channel responses may be expected to vary. The channel-to-channel calibration methods are applicable only to the channel elements spaced by the equal distance $l_2$ on the transmission line $L_{TL}$. For example, the transmitter front ends TX0-TX7 are grouped into one group, and the transmitter front ends TX8-TX15 are grouped into another group for performing the channel-to-channel calibration methods 3-6. The more elements in one group, the more accurate the gain or phase mismatch can be estimated and removed. When all transmitter front ends RX0-RX15 are arranged in a loop, separated by the equal distance $l_2$ to one another, there is no error in the gain or phase mismatch estimation by using the channel-to-channel calibration methods 3-6.

Figure 3:
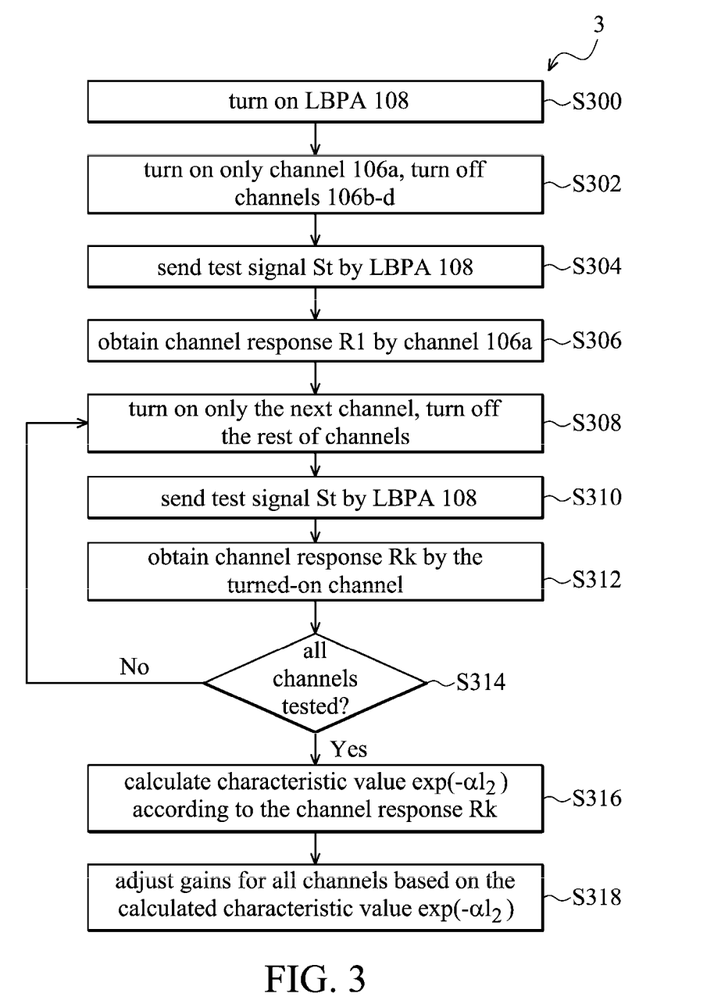
FIG. 3 is a flowchart of a gain calibration method for a phased-array receiver according to an embodiment of the invention.

FIG. 3 is a flowchart of a channel-to-channel gain calibration method 3 for the receive paths according to an embodiment of the invention, incorporating the phased array devices 1 or 2 in the invention.

Upon startup of the gain calibration method 3, the phased-array device 1 is configured to activate the loopback PA 108, deactivate the loopback LNA 110, and prepare the loopback PA 108 for initiating the test signal St on the transmission line $L_{TL}$ (S300). Further, the phased-array device 1 is configured to turn only on the first channel element, such as the channel 106a, while keeping the rest of the channel elements (channel 106b-d) off (S302), so that the channel 106a is the only one channel that can receive the signals from the transmission line $L_{TL}$. The receiver front end in the channel 106a is set to a default digital gain setting $D_{G0}$ and a default digital phase setting $D_{\phi0}$. The loopback PA 108 can place the test signal St' on the transmission line $L_{TL}$ for the receiver front end to pick up (S304). In response, the first channel 106a can acquire the test signal St', down-convert and digitize the test signal St' to derive a first receiver channel response R0 for the calibration circuit 1000 to determine the channel-to-channel mismatch (S306). The first receiver channel response R0 can be expressed as $S_{BB0}\exp(j\theta_{BB0})$, with SBB0 being the amplitude and $\theta_{BB0}$ being the phase shift of the channel response signal R0 with reference to the test signal St.

The phased-array device 1 can then turn on only the second channel element 106b and turn off the remaining channels 106a,c-d (S308), send the test signal St' again onto the transmission line $L_{TL}$ through the loopback PA 108 (S310), and obtain the test signal St' through the receiver front end of the second channel element 106b (S312). While acquiring the test signal St' from the transmission line $L_{TL}$, the receiver front end of the channel 106b is set to a default digital gain setting DG1 and a default digital phase setting D$\phi$1. The test signal St' undergoes every circuit element and process on the receive path via the second channel element 106b to be the second channel response R1 for the calibration circuit 1000 to determine the channel-to-channel mismatch. The second receiver channel response R1 can be expressed as $S_{BB1}\exp(j\theta_{BB1})$, with SBB1 being the amplitude and $\theta_{BB1}$ being the phase shift of the channel response signal R1 with reference to the test signal St. The channel-to-channel gain calibration method 3 only turn on one channel element 106 at a time, to measure the corresponding channel response specifically for the turned-on channel.

Next, the gain calibration method 3 continues to switch the active channel for taking the next channel response Rk, with k being the channel count 0-3 in the case of phased-array device 1. The calibration circuit 1000 or a channel count circuit (not shown) can determine whether all channels in the phased-array device 1 have the channel response measurements SBBK taken for (S314).

When all channel responses RK are collected, the calibration circuit 1000 can now calculate characteristic value $\exp(-\alpha l_2)$ for the transmission line $L_{TL}$ according to the amplitudes $S_{BBk}$ of the channel responses RK (S316). Specifically, the calibration circuit 1000 can compute a gain mismatch parameter $$\frac{S_{BBk}}{S_{BB(k+1)}}$$

between any two adjacent channel elements 106, as expressed by Eq. (1):

$$\Delta S_{BBk} = \frac{S_{BBk}}{S_{BB(k+1)}} = \exp(-\alpha l_2) \frac{G_k}{G_{k+1}} \quad \text{Eq. (1)}$$

where $G_k$ is a current gain of a current channel element 106; $G_{k+1}$ is a next gain of a next channel element 106; and $\exp(-\alpha l_2)$ represents a transmission line gain (or attenuation) due to the transmission line length $l_2$.

The channel-to-channel gain mismatch calibration is used to calibrate the channel gain $G_k$ for all channel element 106a-d, so that all channel gains $G_k$ are substantially the same to one another, or gain mismatch $G_k/G_{k+1} \approx 1$. Therefore the calibration circuit 1000 can determine the gain mismatch parameter $\Delta S_{BBk}$ for all adjacent channel elements, then determine the characteristic value $\exp(-\alpha l_2)$ for the transmission line $L_{TL}$ based on all gain mismatch parameters, as expressed by Eq. (2) and Eq. (3):

$$\Delta S_{BB1} \times \Delta S_{BB2} \ldots \times \Delta S_{BBn} = \exp(-n\alpha l_2) \frac{G_0}{G_n} \quad \text{Eq. (2)}$$

where (n+1) is a number of the channel elements 106 separated by length $l_2$.

$$\Rightarrow \exp(-\alpha l_2) = \sqrt[n]{\frac{\Delta S_{BB1} \times \Delta S_{BB2} \ldots \times \Delta S_{BBn}}{\frac{G_0}{G_n}}} \quad \text{Eq. (3)}$$

Eq. (3) shows that the characteristic value $\exp(-\alpha l_2)$ for the transmission line $L_{TL}$ only depends on the gain mismatch parameters $\Delta S_{BBk}$ and $(G_0/G_n)$. Eq. (3) also indicates that the characteristic value $\exp(-\alpha l_2)$ can be determined based on a product of the gain mismatch parameters $$\frac{S_{BBk}}{S_{BB(k+1)}}$$

(characteristic differences). The term $(G_0/G_n)$ is kept within 1 dB error by circuit design or circuit configuration, therefore the gain mismatch $(G_k/G_{k+1})$ can be kept within 1/n dB error. The error of the determined characteristic value $\exp(-\alpha l_2)$ decreases with an increase in the number n of the channel elements 106 separated by length $l_2$. It follows that the accuracy of the estimated gain mismatch $(G_k/G_{k+1})$ increases with the number n of the channel elements 106. It is noted that in some embodiments, all channel elements 106 are placed in a loop, each spaced by the transmission line length $l_2$ to the adjacent channel element 106, the gain $G_n$ for the last channel element 106 can be considered as the gain $G_0$ for the first channel element 106, and the term $(G_0/G_n)$ is reduced to 1, or 0 dB error, consequently the estimated gain mismatch $(G_k/G_{k+1})$ can also be kept at 0 dB error.

The gain calibration method 3 can determine the gain mismatch $(G_k/G_{k+1})$ according to Eq. (4).

$$\Rightarrow \frac{G_k}{G_{k+1}} = \frac{\Delta S_{BBk}}{\sqrt[n]{\frac{\Delta S_{BB1} \times \Delta S_{BB2} \ldots \times \Delta S_{BBn}}{\frac{G_0}{G_n}}}} \quad \text{Eq. (4)}$$

The calibration circuit 1000 can adjust the receiver gain of the second channel element 106b with reference to the receiver gain of the first channel element 106a (S318), then run Steps S308-S312 again for determining the channel response R1' of the second channel element 106b. Accordingly, the receiver gains of the receiver front ends can be adjusted by the digital gain control signals. Based on the new channel response R1', the calibration circuit 1000 can determine whether $(S_{BB1}'/S_{BB0})$ now approaches to the characteristic value $\exp(-\alpha l_2)$ within a predetermined range set during the circuit design. The calibration circuit 1000 can adjust the receiver gain again until $(S_{BB1}'/S_{BB0})$ is substantially the same as the characteristic value $\exp(-\alpha l_2)$.

Following by the gain adjustment for the second channel element, the calibration circuit 1000 next can adjust the receiver gain for the next channel element 106c with reference to the receiver gain of the previous channel element 106b and determine the new channel response R2' after the gain calibration. Based on the newly determined channel response R2', the calibration circuit 1000 can further determine whether the gain mismatch parameter $(S_{BB2}'/S_{BB1})$ is substantially the same as the characteristic value $\exp(-\alpha l_2)$. If so, the gain calibration for the third receiver front end is then completed, and if not, the calibration circuit 1000 can continue adjusting the receiver gain of the third channel element 106c until the $(S_{BB2}'/S_{BB1})$ approaches the characteristic value $\exp(-\alpha l_2)$ to the predetermined range.

The calibration circuit 1000 can perform the gain adjustment procedure for the remaining channel element 106d. The gain calibration method 3 is completed and exited after all receiver front ends of the channel elements 106 have been calibrated for the channel-to-channel gain mismatch.

Taking the phased-array device 2 as an example, to determine the gain mismatches for the receiver front ends RX0-RX7, the gain calibration method 3 is implemented to turn on the loopback PA 108 and turn off the loopback LNA 110 (S300), turn the first receiver front end RX0 on and the remaining receiver front ends RX1-RX7 off (S302), initiate the test signal St' on the transmission line LTL by loopback PA 108 (S304), obtain the first channel response R0 by the first receiver front end RX0 (S306), hence complete the round for determining the channel response R0 for the first receiver front end RX0. The gain calibration method 3 then carries on to obtain the other 7 channel responses R1-R7 for the remaining receiver front ends RX1-RX7 based on the loop outlined in Step S308-S314 until the channel responses for all receiver front ends RX0-RX7 are collected. The gain calibration method 3 next is implemented to calculate the characteristic value $\exp(-\alpha l_2)$ by applying the channel responses R0-R7 into Eq. (1), (2), and (3) (S316), and adjust gain settings for the receiver front ends RX1-RX7 by the digital gain control signals until all gain mismatch parameters $$\frac{S_{BB0}}{S_{BB1}}, \frac{S_{BB1}}{S_{BB2}}, \ldots, \frac{S_{BB6}}{S_{BB7}}$$

equal to the characteristic value $\exp(-\alpha l_2)$ (S318).

The gain calibration method 3 employs a plurality of channel responses Rk for computing the characteristic value $\exp(-\alpha l_2)$, thereby reducing the error in estimated characteristic value $\exp(-\alpha l_2)$ and increasing the accuracy for determining the channel-to-channel gain mismatch. Further, when all channel elements 106 are placed in a loop with an equal distance $l_2$ to the adjacent channel elements 106, the error for gain mismatch determination can be reduced to 0.

Figure 4:
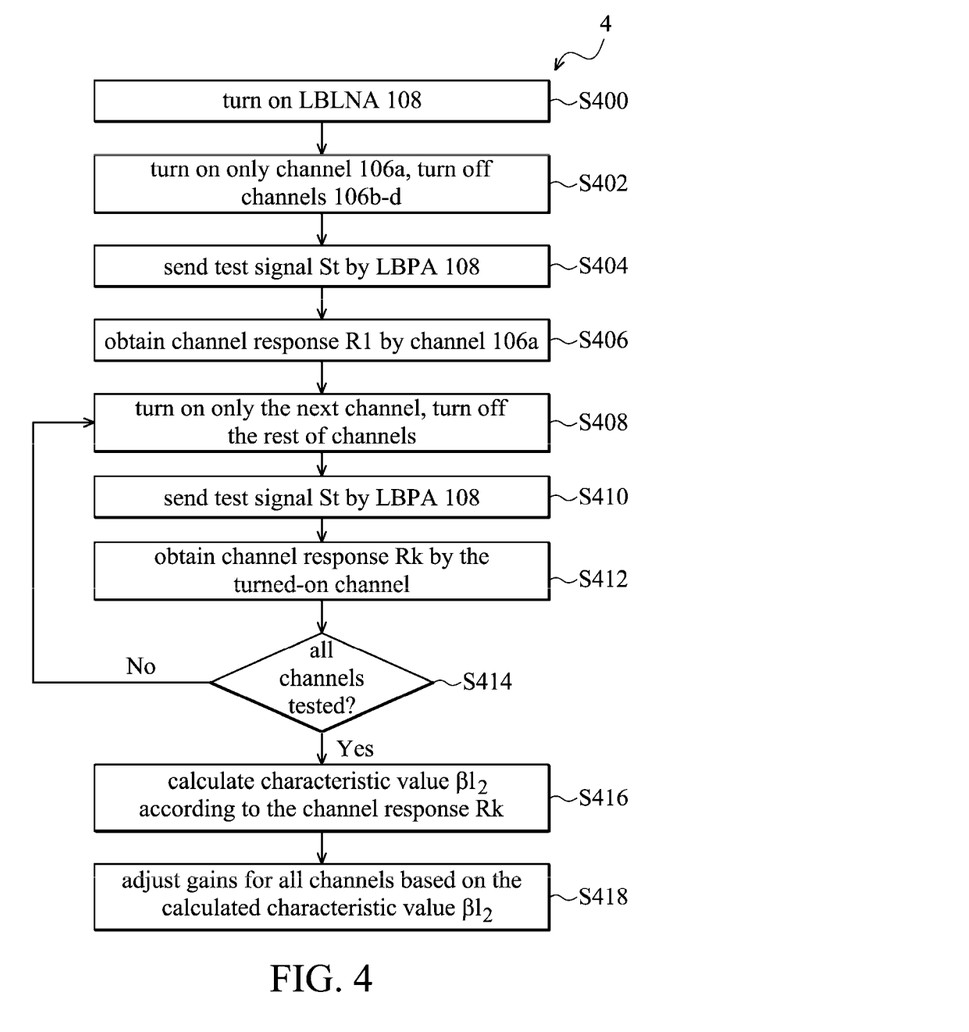
FIG. 4 is a flowchart of a phase calibration method for a phased-array receiver according to an embodiment of the invention.

FIG. 4 is a flowchart of a channel-to-channel phase calibration method 4 for the receive paths according to an embodiment of the invention, incorporating the phased array devices 1 or 2 in the invention.

Steps S400 through S414 are identical to Steps S300 through S314, reference therefor can be found in the preceding paragraph and will not be repeated here for brevity. Accordingly, the channel response R1 for the first channel element 106a can be expressed by $S_{BB1}\exp(j\theta_{BB1})$, the channel response R2 for the second channel element 106b can be expressed by $S_{BB2}\exp(j\theta_{BB2})$. For the channel-to-channel phase calibration, the calibration circuit 1000 reduces or removes the phase difference between channel elements, i.e., $\theta_{BBk}-\theta_{BB(k+1)} \approx 0$.

After all channel responses RK are collected, the calibration circuit 1000 can now calculate characteristic value $(\beta l_2)$ for the transmission line $L_{TL}$ according to the phase $\theta_{BBk}$ of the channel response RK (S416). Specifically, the calibration circuit 1000 can compute a phase mismatch parameter $\Delta\theta_{BBk}$ between any two adjacent channel elements 106, as expressed by Eq. (5):

In step S416

$$\Delta\theta_{BBk} = \theta_{BBk} - \theta_{BB(k+1)} = -\beta l_2 + \theta_k - \theta_{k+1} \qquad \text{Eq. (5)}$$

where $\theta_{BBk}$ is a current phase value of a current channel element 106;

$\theta_{BBk+1}$ is a next phase value of a next channel element 106; and $\beta l_2$ represents a phase shift due to the transmission line length $l_2$.

The calibration circuit 1000 can determine the phase mismatch parameter $\Delta\theta_{BBk}$ for all adjacent channel elements, then determine the characteristic value $(\beta l_2)$ for the transmission line $L_{TL}$ based on all phase mismatch parameters $\Delta\theta_{BBk}$, as expressed by Eq. (6) and Eq. (7):

$$\sum_{k=1}^{n-1} \Delta\theta_{BBk} = -(n-1)\beta l_2 + \theta_1 - \theta_n \qquad \text{Eq. (6)}$$

where n is a number of the channel elements 106 separated by length $l_2$.

$$\beta l_2 = \frac{\theta_1 - \theta_n - \sum_{k=1}^{n-1} \Delta\theta_{BBk}}{n-1} \qquad \text{Eq. (7)}$$

Eq. (7) shows that the characteristic value $(\beta l_2)$ for the transmission line $L_{TL}$ only depends on the phase mismatch parameter $\Delta\theta_{BBk}$ and $(\theta_1-\theta_n)$. Further, Eq. (7) also indicates that the characteristic value $(\beta l_2)$ may be determined based on a sum of the phase mismatch parameter $\Delta\theta_{BBk}$ (characteristic differences). The phase mismatch parameter $\Delta\theta_{BBk}$ is known by the phases $\theta_k$ and $\theta_{k+1}$. The term $(\theta_1-\theta_n)$ can be kept within 10 degree error by circuit design or circuit configuration, therefore the error of the estimated phase mismatch $(\theta_k-\theta_{k+1})$ can be kept within $10/(n-1)$ degree. It can be seen in Eq. (7) that the error of the determined characteristic value $(\beta l_2)$ decreases with an increase in the number n of the channel elements 106 separated by length $l_2$. It follows that the accuracy of the estimated phase mismatch $(\theta_k-\theta_{k+1})$ increases with the number n of the channel elements 106. In some embodiments, all channel elements 106 are placed in a loop, each spaced by the transmission line length $l_2$ to the adjacent channel element 106, the phase $\theta_n$ for the last channel element 106 can be considered as the phase $\theta_1$ for the first channel element 106, and the term $(\theta_1-\theta_n)$ can be reduced to 0, consequently the estimated phase mismatch $(\theta_k-\theta_{k+1})$ can also be kept at 0 degree.

The phase calibration method 4 can determine the phase mismatch $(\theta_k-\theta_{k+1})$ according to Eq. (8).

$$\theta_k - \theta_{k+1} = \Delta\theta_{BBk} + \beta l_2 = \Delta\theta_{BBk} + \frac{\theta_1 - \theta_n - \sum_{k=1}^{n-1} \Delta\theta_{BBk}}{n-1} \qquad \text{Eq. (8)}$$

The calibration circuit 1000 can adjust the receiver phase of the second channel element 106b with reference to the receiver phase of the first channel element 106a (S418), then run Steps S408-S412 again for determining an updated channel response R1' of the second channel element 106b. Accordingly, the receiver phases of the receiver front ends can be adjusted by the digital phase control signals. Based on the updated channel response R1', the calibration circuit 1000 can determine whether $(\theta_{BB0}-\theta_{BB1}')$ approaches to the characteristic value $(\beta l_2)$ within a predetermined range set during the circuit design. The calibration circuit 1000 can adjust the receiver phase until $(\theta_{BB0}-\theta_{BB1}')$ is substantially the same as the characteristic value $(\beta l_2)$.

Following by the phase adjustment for the second channel element, the calibration circuit 1000 next can adjust the receiver phase for the next channel element 106c with reference to the receiver phase of the previous channel element 106b and determine the new channel response R2' after the phase calibration. Based on the newly determined channel response R2', the calibration circuit 1000 can further determine whether the phase mismatch parameter $(\theta_{BB1}'-\theta_{BB2}')$ is substantially the same as the characteristic value $(\beta l_2)$. If so, the phase calibration for the third receiver front end is then completed, and if not, the calibration circuit 1000 can continue adjusting the receiver phase of the third channel element 106c until the $(\theta_{BB1}'-\theta_{BB2}')$ approaches the characteristic value $(\beta l_2)$ to the predetermined range.

The calibration circuit 1000 can perform the phase adjustment procedure for the remaining channel element 106d. The phase calibration method 4 is completed and exited after all receiver front ends of the channel elements 106 have been calibrated for the channel-to-channel phase mismatch.

Taking the phased-array device 2 as an example, to determine the phase mismatches for the receiver front ends RX0-RX7, the phase calibration method 4 is implemented to turn on the loopback PA 108 and turn off the loopback LNA 110 (S400), turn the first receiver front end RX0 on and the remaining receiver front ends RX1-RX7 off (S402), initiate the test signal St' on the transmission line LTL by loopback PA 108 (S404), obtain the first channel response R0 by the first receiver front end RX0 (S406), hence complete the round for determining the channel response R0 for the first receiver front end RX0. The phase calibration method 4 then carries on to obtain the other 7 channel responses R1-R7 for the remaining receiver front ends RX1-RX7 based on the loop outlined in Step S408-S414 until the channel responses for all receiver front ends RX0-RX7 are collected. The phase calibration method 4 next is implemented to calculate the characteristic value ($\beta l_2$) by applying the channel responses R0-R7 into Eq. (5), (6), and (7) (S416), and adjust phase settings for the receiver front ends RX1-RX7 by the digital phase control signals until all phase mismatch parameters $(\theta_{BB0}-\theta_{BB1})$, $(\theta_{BB1}-\theta_{BB2})$, ..., $(\theta_{BB7}-\theta_{BB6})$ equal to the characteristic value $\exp(\beta l_2)$ (S418).

The phase calibration method 4 employs a plurality of channel responses Rk for computing the characteristic value ($\beta l_2$) of the transmission line segment $l_2$, thereby reducing the error in the estimated characteristic value ($\beta l_2$) and increasing the accuracy for determining the channel-to-channel phase mismatch ($\theta_k-\theta_{k+1}$). Further, when all channel elements 106 are placed in a loop with an equal distance $l_2$ to the adjacent channel elements 106, the error for phase mismatch determination can be reduced to 0.

Figure 5:
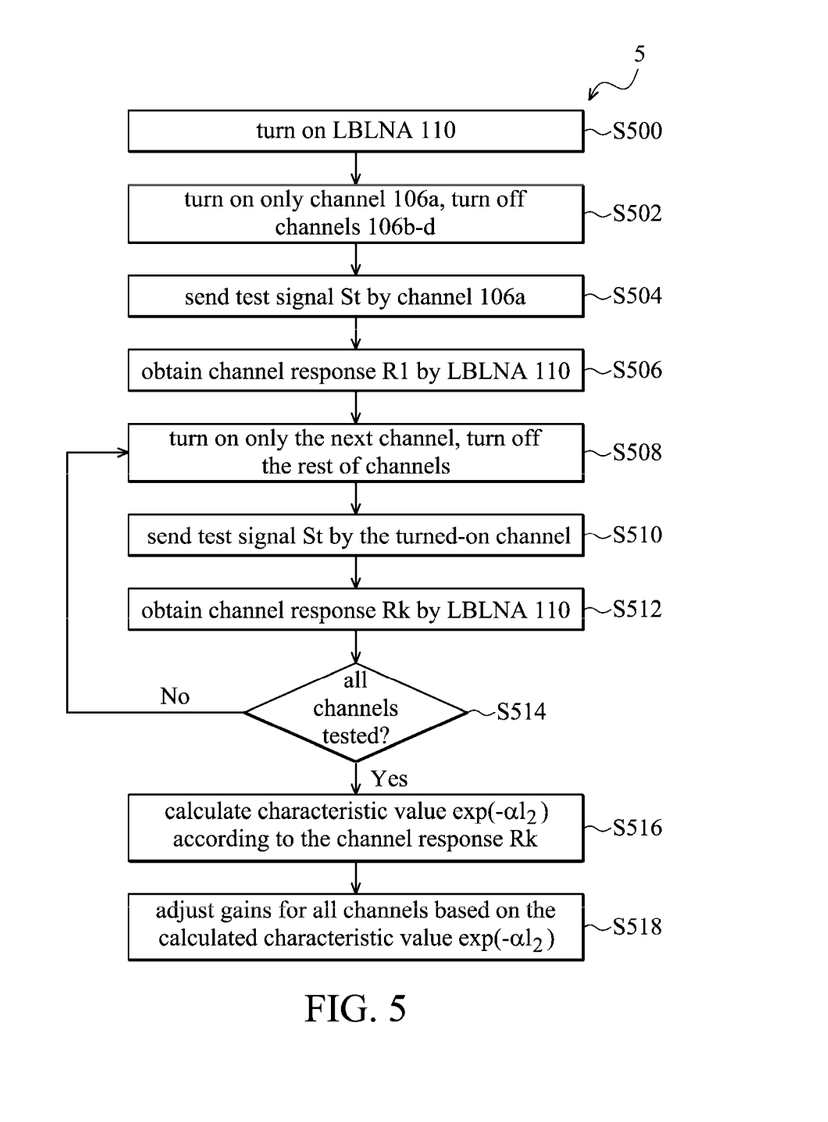
FIG. 5 is a flowchart of a gain calibration method for a phased-array transmitter according to an embodiment of the invention.

FIG. 5 is a flowchart of a channel-to-channel gain calibration method 5 for the transmission paths according to an embodiment of the invention, incorporating the phased array devices 1 or 2 in the invention.

Upon startup of the gain calibration method 5, the phased-array device 1 is configured to activate the loopback LNA 110, deactivate the loopback PA 108, and prepare the loopback LNA 110 for initiating the test signal St on the transmission line $L_{TL}$ (S500). Further, the phased-array device 1 is configured to turn only on the first transmitter front end of the channel element, such as the channel element 106$a$, while keeping the transmitter front ends the rest of the channel elements (channel 106$b$-$d$) off (S502), so that the channel 106$a$ is the only one channel that can transmit the signals onto the transmission line $L_{TL}$. The transmitter front end in the channel 106$a$ is set to a default digital gain setting $D_{G0}$ and a default digital phase setting $D_{\phi0}$. The first channel element 106$a$ can send the test signal St' onto the transmission line $L_{TL}$ for the loopback LNA 110 to pick up (S504). In response, the loopback LNA 110 can acquire the test signal St', down-convert and digitize the test signal St' to derive a first transmitter channel response R0 for the calibration circuit 1000 to determine the channel-to-channel mismatch (S506). The first transmitter channel response R0 can be expressed as $S_{BB0}\exp(j\theta_{BB0})$, with SBB0 being the amplitude and $\theta_{BB0}$ being the phase shift of the channel response signal R0 with reference to the test signal St.

The phased-array device 1 can then turn on only the second transmitter front end of the channel element 106$b$ and turn off the transmitter front ends of the remaining channel elements 106$a$,$c$-$d$ (S508), send the test signal St' again onto the transmission line $L_{TL}$ through the second transmitter front end (S510), and obtain the test signal St' through the loopback LNA 110 (S512). While delivering the test signal St' onto the transmission line $L_{TL}$, the transmitter front end of the channel 106$b$ is set to a default digital gain setting $D_{G1}$ and a default digital phase setting $D_{\phi1}$. The test signal St' undergoes every circuit element and process on the transmission path via the second channel element 106$b$ and loops back to the baseband circuit 100 via the loopback LNA 110 to be the second channel response R2 for determining the channel-to-channel transmitter gain mismatch. The second transmitter channel response R1 can be expressed as $S_{BB1}\exp(j\theta_{BB1})$, with SBB1 being the amplitude and $\theta_{BB1}$ being the phase shift of the channel response signal R1 with reference to the test signal St. The channel-to-channel gain calibration method 5 only turn on one channel element 106 at a time, to measure the corresponding channel response specifically for the turned-on channel.

Next, the gain calibration method 5 continues to switch the active channel for taking the next channel response Rk, with k being the channel count 0-3 in the case of phased-array device 1. The calibration circuit 1000 or a channel count circuit (not shown) can determine whether all channels in the phased-array device 1 have the channel response measurements $S_{BBK}$ taken (S514). When all channel responses RK are collected, the calibration circuit 1000 can calculate characteristic value $\exp(-\alpha l_2)$ for the transmission line $L_{TL}$ according to the amplitudes $S_{BBk}$ of the channel responses RK (S516). The calibration circuit 1000 can compute a gain mismatch parameter $\Delta S_{BBk}$ between any two adjacent channel elements 106 according to Eq. (1). After the gain mismatch parameters $\Delta S_{BBk}$ for all adjacent channel elements are computed, the calibration circuit 1000 can determine the characteristic value $\exp(-\alpha l_2)$ for the transmission line $L_{TL}$ based on all gain mismatch parameters $\Delta S_{BBk}$ according to Eq. (2) and Eq. (3), and determine the gain mismatch ($G_k/G_{k+1}$) according to Eq. (4), and adjust the gain settings for the transmitter front ends of the channel elements 106$b$-$d$ according to the estimated gain mismatch ($G_k/G_{k+1}$) by the gain adjustment procedure outlined in the gain calibration method 3. Steps S516 to S518 in FIG. 5 are identical to Step S316-S318 in FIG. 3, relevant explanation for the gain adjustment can be found in the preceding paragraphs. The gain calibration method 5 is completed and exited after the transmitter front ends of the channel elements 106$b$-$d$ have been calibrated for the channel-to-channel gain mismatch.

Taking the phased-array device 2 as an example, to determine the gain mismatches for the transmitter front ends TX0-TX7, the gain calibration method 5 is implemented to turn on the loopback LNA 110 and turn off the loopback PA 108 (S500), turn the first transmitter front end TX0 on and the remaining transmitter front ends TX1-TX7 off (S502), place the test signal St' on the transmission line $L_{TL}$ by the first transmitter front end TX0 (S504), obtain the first channel response R0 by the loopback LNA 110 (S506), hence complete the round for determining the channel response R0 for the first transmitter front end TX0. The gain calibration method 5 then carries on to obtain the other 7 channel responses R1-R7 for the remaining transmitter front ends TX1-TX7 based on the loop outlined in Step S508-S514 until the channel responses for all transmitter front ends TX0-TX7 are collected. The gain calibration method 5 next is implemented to calculate the characteristic value $\exp(-\alpha l_2)$ by applying the channel responses R0-R7 into Eq. (1), (2), and (3) (S516), and adjust gain settings for the transmitter front ends TX1-TX7 by the digital gain control signals until all gain mismatch parameters $$\frac{S_{BB0}}{S_{BB1}}, \frac{S_{BB1}}{S_{BB2}}, \ldots, \frac{S_{BB6}}{S_{BB7}}$$

equal to the characteristic value exp(−αl$_2$) (S518).

The gain calibration method 5 employs a plurality of channel responses Rk for computing the characteristic value exp(−αl$_2$) of the transmission line segment l$_2$, thereby reducing the error in estimated characteristic value exp(−αl$_2$) and increasing the accuracy for determining the channel-to-channel gain mismatch. Further, when all channel elements 106 are placed in a loop with an equal distance l$_2$ to the adjacent channel elements 106, the error for gain mismatch determination can be reduced to 0.

Figure 6:
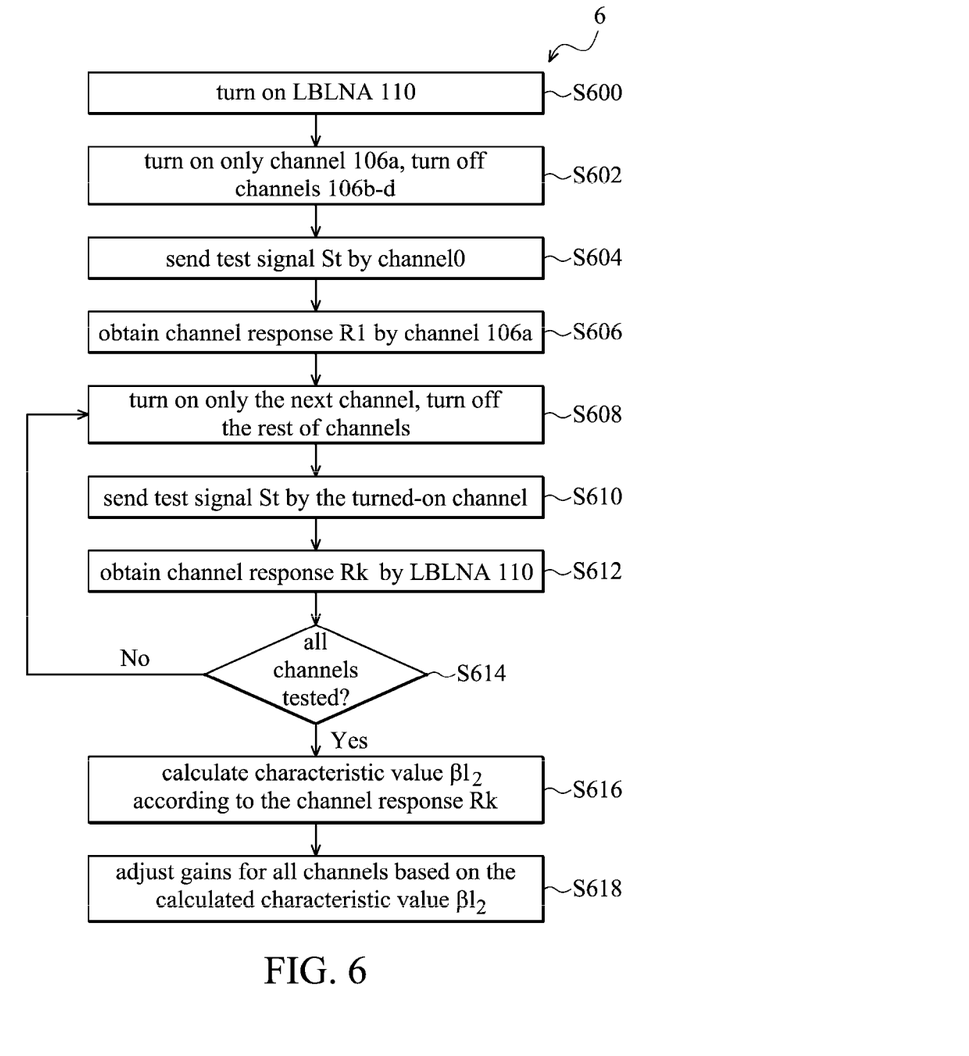
FIG. 6 is a flowchart of a phase calibration method for a phased-array transmitter according to an embodiment of the invention.

FIG. 6 is a flowchart of a channel-to-channel phase calibration method 6 for the transmission paths according to an embodiment of the invention, incorporating the phased array devices 1 or 2 in the invention.

Steps S600 through S614 are identical to Steps S500 through S514 in FIG. 5, Steps S616 through S618 are identical to Steps S416 through S418 in FIG. 4, reference therefor can be found in the preceding paragraph and will not be repeated here for brevity. Accordingly, the channel response R1 for the first channel element 106a can be expressed by S$_{BB1}$exp(jθ$_{BB1}$), the channel response R2 for the second channel element 106b can be expressed by S$_{BB2}$exp(jθ$_{BB2}$). For the channel-to-channel phase calibration, the calibration circuit 1000 serves to reduce or remove the phase difference between the transmitter front ends of the channel elements 106, i.e., θ$_{BBk}$−θ$_{BB(k+1)}$≈0.

Taking the phased-array device 2 as an example, to determine the phase mismatches for the transmitter front ends TX0-TX7, the phase calibration method 6 is implemented to turn on the loopback LNA 110 and turn off the loopback PA 108 (S600), turn the first transmitter front end TX0 on and the remaining transmitter front ends TX1-TX7 off (S602), place the test signal St' on the transmission line L$_{TL}$ by the first transmitter front end TX0 (S604), obtain the first channel response R0 by the loopback LNA 110 (S606), hence complete the round for determining the channel response R0 for the first transmitter front end TX0. The phase calibration method 6 then carries on to obtain the other 7 channel responses R1-R7 for the remaining transmitter front ends TX1-TX7 based on the loop outlined in Step S608-S614 until the channel responses for all transmitter front ends TX0-TX7 are collected. The phase calibration method 6 next is implemented to calculate the characteristic value (βl$_2$) by applying the channel responses R0-R7 into Eq. (5), (6), and (7) (S616), and adjust phase settings for the transmitter front ends TX1-TX7 by the digital phase control signals until all phase mismatch parameters (θ$_{BB0}$−θ$_{BB1}$), (θ$_{BB1}$−θ$_{BB2}$), . . . , (θ$_{BB7}$−θ$_{BB6}$) equal to the characteristic value exp(−βl$_2$) (S618).

The phase calibration method 6 employs a plurality of channel responses Rk for computing the characteristic value (βl$_2$) of the transmission line segment l$_2$, thereby reducing the error in the estimated characteristic value (βl$_2$) and increasing the accuracy for determining the channel-to-channel phase mismatch (θ$_k$−θ$_{k+1}$) for the transmitter front ends. Further, when all channel elements 106 are placed in a loop with an equal distance l$_2$ to the adjacent channel elements 106, the error for phase mismatch determination can be reduced to 0.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A calibration method, performed on a phased array device comprising a plurality of channel elements coupled in parallel by a transmission line, the method comprising:
    initiating a test signal by the phased array device and looping back a plurality of channel responses corresponding to the plurality of channel elements through the transmission line to a calibration circuit in the phased array device, wherein each of the channel responses is obtained when one of the plurality of channel elements is turned on, and the rest of the plurality of channel elements are turned off, wherein the plurality of channel elements comprise RF transmitter front-ends, and wherein obtaining the plurality of channel responses comprises: sending the test signal to the turned-on RF transmitter front-end when the rest of the RF transmitter front-ends are turned off; receiving a signal outputted by the turned-on RF transmitter front-end through a loopback amplifier on the transmission line; and determining the channel response corresponding to the turned-on RF transmitter front-end based on the received signal;
    calculating a characteristic value corresponding to the transmission line by the phased array device based on the obtained channel responses of the plurality of channel elements; and
    adjusting a channel parameter of one of the plurality of channel elements by the phased array device based on the characteristic value of the transmission line.

2. The calibration method of claim 1, wherein the plurality of channel elements are RF transmitter front-ends or RF receiver front-ends.

3. The calibration method of claim 1, wherein when the plurality of channel elements are RF transmitter front-ends, the transmission line is coupled to output ports of the RF transmitter front-ends; when the plurality of channel elements are RF receiver front-ends, the transmission line is coupled to input ports of the RF receiver front-ends.

4. The calibration method of claim 1, wherein each two adjacent channel elements of the plurality of channel elements are spaced by substantially a same length.

5. The calibration method of claim 1, wherein when the plurality of channel elements are RF receiver front-ends, the plurality of channel responses are obtained by:

sending the test signal to the turned-on RF receiver front-end through the transmission line when the rest of the RF receiver front-ends are turned off;

receiving a signal outputted by the turned-on RF receiver front-end; and determining the channel response corresponding to the turned-on RF receiver front-end based on the received signal.

6. The calibration method of claim 1, wherein the channel responses corresponding to the plurality of channel elements are amplitude values or phase values of signals outputted by the plurality of channel elements.

7. The calibration method of claim 1, wherein the step of calculating the characteristic value corresponding to the transmission line based on the channel responses of the plurality of channel elements comprises:

obtaining a plurality of characteristic differences between the channel responses;

determining the characteristic value corresponding to the transmission line by the characteristic differences.

8. The calibration method of claim 7, wherein the channel responses comprise amplitude values outputted by the plurality of channel elements, and the step of calculating the characteristic value corresponding to the transmission line based on the channel responses of the plurality of channel elements comprises:

determining the characteristic value based on a product of the characteristic differences.

9. The calibration method of claim 7, wherein the channel responses comprise phase values outputted by the plurality of channel elements, and the step of calculating the characteristic value corresponding to the transmission line based on the channel responses of the plurality of channel elements comprises:

determining the characteristic value based on a sum of the characteristic differences.

10. The calibration method of claim 1, wherein when the channel responses corresponding to the plurality of channel elements are amplitude values of signals outputted by the plurality of channel elements, the adjusted channel parameter is a gain setting of the corresponding channel element; when the channel responses corresponding to the plurality of channel elements are phase values of signals outputted by the plurality of channel elements, the adjusted channel parameter is a phase setting of the corresponding channel element.

11. A phased array device, comprising:
a transmission line;
a plurality of channel elements coupled in parallel by the transmission line;
a loopback amplifier; and
a calibration circuit, configured to initiate a test signal on the transmission line, obtain a plurality of channel responses corresponding to the plurality of channel elements through the transmission line, wherein the plurality of channel elements are RF transmitter front-ends, and wherein the calibration circuit is configured to send the test signal to the turned-on RF transmitter front-end when the rest of the RF transmitter front-ends are turned off, receive a signal outputted by the turned-on RF transmitter front-end through the loopback amplifier on the transmission line, and determine the channel response corresponding to the turned-on RF transmitter front-end based on the received signal, wherein the calibration circuit is further configured to calculate a characteristic value corresponding to the transmission line based on the obtained channel responses of the plurality of channel elements, and adjust a channel parameter of one of the plurality of channel elements based on the characteristic value of the transmission line, wherein each of the channel responses is obtained when one of the plurality of channel elements is turned on, and the rest of the plurality of channel elements are turned off.

12. The phased array device of claim 11, wherein when the plurality of channel elements are RF transmitter front-ends, the transmission line is coupled to output ports of the RF transmitter front-ends; when the plurality of channel elements are RF receiver front-ends, the transmission line is coupled to input ports of the RF receiver-front-ends.

13. The phased array device of claim 11, wherein the plurality of channel elements are RF receiver front-ends, the calibration circuit is configured to send the test signal to the turned-on RF receiver front-end through the transmission line when the rest of the RF receiver front-ends are turned off, receive a signal outputted by the turned-on RF receiver front-end; and determine the channel response corresponding to the turned-on RF receiver front-end based on the received signal.

14. The phased array device of claim 11, wherein the calibration circuit is configured to:

obtain a plurality of characteristic differences between the channel responses; and determine the characteristic value corresponding to the transmission line by the characteristic differences.

15. The phased array device of claim of claim 13, wherein the channel responses comprises amplitude values outputted by the plurality of channel elements, and the calibration circuit is configured to determine the characteristic value based on a product of the characteristic differences.

16. The phased array device of claim of claim 13, wherein the channel responses comprises phase values outputted by the plurality of channel elements, and the calibration circuit is configured to determine the characteristic value based on a sum of the characteristic differences.

17. The phased array device of claim 11, wherein when the channel responses corresponding to the plurality of channel elements are amplitude values of signals outputted by the plurality of channel elements, the adjusted channel parameter is a gain setting of the corresponding channel element; when the channel responses corresponding to the plurality of channel elements are phase values of signals outputted by the plurality of channel elements, the adjusted channel parameter is a phase setting of the corresponding channel element.

* * * * *